United States Patent
Li et al.

Patent Number: 5,781,679
Date of Patent: Jul. 14, 1998

[54] LIGHT DISPERSIVE OPTICAL FIBER

[75] Inventors: Yao Li, Monmouth Junction; Ting Wang, Princeton, both of N.J.

[73] Assignee: NEC Research Institute, Inc., Princeton, N.J.

[21] Appl. No.: 853,274

[22] Filed: May 9, 1997

[51] Int. Cl.$^6$ ...................................... G02B 6/26
[52] U.S. Cl. .................. 385/48; 385/43; 385/41; 385/123
[58] Field of Search .................. 385/31, 41, 42, 385/43, 44, 45, 46, 48, 147, 901, 123, 128; 362/32

[56] References Cited

U.S. PATENT DOCUMENTS 5,673,344    9/1997    Li et al. ................................ 385/48

OTHER PUBLICATIONS

F. Suzuki, "Novel Plastic Image-Transmitting Fiber", SPIE vol. 1592, Plastic Optical Fibers, 1991, No Month.

G. Brun et al, "Plastic Optical Fiber For Lateral Illumination: Chemical Studies and Optical Measurements", The European Institute for Communications and Networks, Geneva, 1995, No Month.

J. Farenc, et al, "Illumination, Signalisation and Decoration Using Plastic Optical Fibers", The European Institute for Communciations and Networks, Geneva, 1995.

S. Sottini et al, "Optical Fiber-Polymer Guide Coupling by a Tapered Graded Index Glass Guide", IEEE Journal of Quantum Electronics, vol. 31, No. 6, Jun. 1995.

Y. Li et al, "Distribution of Light Power and Optical Signals Using Embedded Mirrors Inside Polymer Optical Fibers", IEEE Photonics Technology Letters, vol. 8, No. 10, Oct. 1996.

*Primary Examiner*—Phan T. H. Palmer
*Attorney, Agent, or Firm*—Jeffrey J. Brosermer

[57] ABSTRACT

A method and apparatus for tapping and distributing light propagating through a polymer optical fiber (POF). Within the polymer optical fiber, one or more mirrors are constructed. At a point in the POF where an internal mirror is constructed, light traversing the POF is efficiently diverted out of the polymer optical fiber upon striking the mirror. The light so diverted passes through a dispersing region such that only diffuse light is emitted and may be put to an advantageous use. Alternatively, a controllable shutter is placed within the polymer optical fiber such that light traversing the POF is diverted out of the polymer optical fiber upon striking the mirror when the controllable shutter so permits. The controllable shutter is variable so that variable amounts of light may be selectively emitted from the POF.

23 Claims, 4 Drawing Sheets

LIGHT DISPERSIVE OPTICAL FIBER

FIELD OF THE INVENTION

The invention relates generally to the field of photonics, and in particular to an optical fiber for dispersively distributing light conducted through a polymer optical fiber.

BACKGROUND OF THE INVENTION

Systems incorporating optical fibers are well known and find an ever-increasing variety of applications. Such systems include optical fiber communications systems, medical instruments, copiers, printers, facsimile machines, optical displays and lighting.

Contemporaneously with the increased use of systems utilizing optical fibers, polymer optical fiber (POF) is being recognized as a cost-effective alternative to conventional glass optical fiber for many of the above-mentioned applications. See for example, F. Suzuki, "Novel Plastic image transmission fiber," Proc. SPIE, 1592, 112–132, (1991); G. Brun, C. Farget, M. Reglat, M. Druetta, J. P. Goure, and J. P. Montheard, "Plastic optic fiber for lateral illumination: chemical studies and optical measurements," in Proc. 4$^{th}$ International Conf. Plastic Optical Fibers & Applications, Boston, Masso. Oct. 17–19, 1995, pp. 187–192; J. Farenc, and P. Destruel, "Illumination, signalisation, and decoration using plastic optical fibers," in Proc. 4th International Conf. Plastic Optical Fibers & Applications, Boston, Masso. Oct. 17–19, 1995, pp.203–205; S. Sottini D. Grando, L. Palchetti, and E. Giorgetti, "Optical fiber-polymer guide coupling by a tapered graded index glass guide," IEEE J. of Quantum Electronics, 31, 174–180 (1995). Among the most frequently cited advantages of using a POF are its fundamental low weight, flexibility, resistance to breaking, low material and connection cost, and immunity to electromagnetic interference.

In many of the application employing POF, small amounts of light traversing the fiber need to be tapped and subsequently emitted from the fiber. Consequently, a number of prior art methods have been developed for causing optical fibers to emit light from the fiber.

U.S. Pat. No. 4,466,697 discloses a light dispersive optical lightpipe and method of making same. The optical lightpipes are doped in a core region with refractive and/or reflective light scattering particles. When light traversing the lightpipe strikes a particle, it is scattered and some of the scattered light exits the lightpipe through a side. As disclosed in this patent, the light scattering particles are preferably incorporated into the lightpipe during manufacture, by adding light scattering material with the molten core before extruding the material as an optical fiber.

U.S. Pat. No. 5,037,172 discloses a method of manufacturing a reflective notch coupler for an optical fiber. The coupler is formed in an optical fiber by a pair of angled surfaces extending from the cladding of the optical fiber and meeting in the fiber's core to form an indentation in the fiber. One surface of the fiber is reflectively coated and couples light into and out of the core of the optical fiber.

U.S. Pat. No. 5,432,876 discloses an illumination device and optical fibers for use within the illumination device. According to the patentees, an optical fiber is provided with a light emitting region along at least a portion of its length. In the light emitting region, there are constructed a number of optical elements which include reflecting surfaces, at least one of which has a cross sectional area less than that of the fiber. Light traversing the fiber which strikes the reflecting surface is reflected out of the fiber. In order to maintain a substantially uniform output illumination along the light emitting region of the fiber, the morphology, pattern and spacing of the optical elements are varied as desired.

Finally, U.S. Pat. application Ser. No. 08/667,164 now U.S. Pat. No. 5,673,344 which is assigned to the present assignee and incorporated herein by reference and in a subsequent article entitled "Distribution of Light Power and Optical Signals Using Embedded Mirrors Inside Polymer Optical Fibers" by Y. Li and T. Wang (the inventor of the present application), which appeared in IEEE Photonics Technology Letters in October, 1996, there is shown how light may be distributed through side-emitting ports along a polymer optical fiber. The ports include an imbedded mirror region, which is produced by cutting and refilling a portion of the optical fiber.

While these prior-art techniques and devices exist for tapping a light signal conducted by an optical fiber, a continuing need exists for methods and devices which tap and control the emission of light from an optical fiber.

SUMMARY OF THE INVENTION

The present invention controllably taps and distributes light propagating through a polymer optical fiber. The invention comprises, in addition to the polymer optical fiber, one or more mirrors constructed from and located within and between the ends of the POF itself.

Viewed from one aspect, the present invention is directed to an apparatus for efficiently tapping and dispersing light conducted through a POF. More specifically, at a point in the POF where an internal mirror is created, light traversing the POF is efficiently diverted out of the polymer optical fiber upon striking the mirror. The light so diverted passes through a dispersing region such that only disperse light is emitted and may be put to an advantageous use.

Viewed from another aspect, the present invention is directed to an apparatus for efficiently controlling the tapping of light conducted through an optical fiber for its distribution. In particular, controllable shutter is placed within the polymer optical fiber such that light traversing the POF is diverted out of the polymer optical fiber upon striking the mirror when the controllable shutter so permits. Advantageously, the controllable shutter is variable so that variable amounts of light may be selectively emitted from the POF.

BRIEF DESCRIPTION OF THE DRAWING

To facilitate reader understanding, identical reference numerals are used to denote identical or similar elements that are common to the figures. The drawings are not necessarily to scale.

DETAILED DESCRIPTION

A preferred embodiment of the invention will now be described while referring to the figures, several of which may be simultaneously referred to during the course of the following description.

Figure 1A:
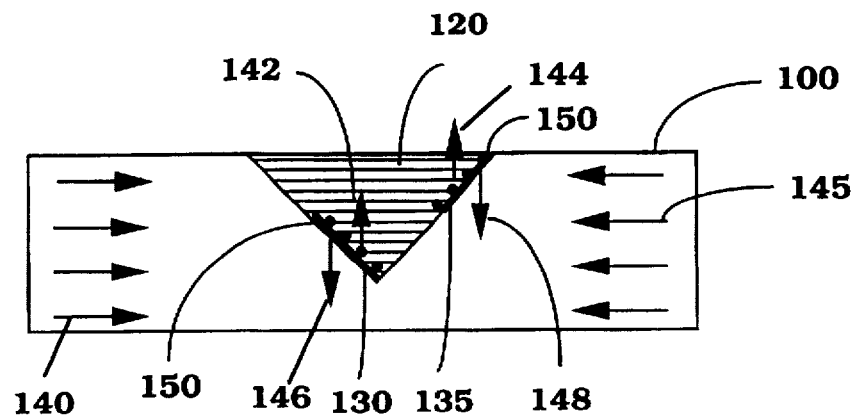
FIG. 1(a) is a cut away view of a POF showing light dispersive micro-mirrors formed inside.

Referring now to FIG. 1(a), there is shown a cut-away view of an optical assembly in accordance with preferred embodiment of the present invention. Polymer optical fiber (POF) 100, which is well known in the art, is depicted having light 140, 145 traversing a length of the POF from opposite directions. Cut and refilled region 120 is shown containing a number of internal mirrors 130, 135. The cut and refilled region containing the internal mirrors may be preferably constructed through a series of micro-cutting, masking, coating and refilling operations. As shown in this Figure, each of the mirrors has dispersive elements 150, incorporated thereon.

The light traversing the POF will be deflected upon striking one of the internal mirrors. For example, light 140 traversing a length of POF is deflected as shown by arrows 146 and 144 upon striking mirrors 130 and 135 respectively. Due to the presence of the dispersive elements 150, the light which strikes the mirrors is dispersively reflected. Similarly, the deflection of light 145 is shown by arrows 142 and 148 when the light strikes mirrors 130 and 135 respectively. Advantageously, the cut and refilled region serves as a port or tap, thereby allowing diffused light 142 and 144 to exit the POF. Those skilled in the art will readily recognize that the port may be bi-directional, and light may be injected through the side of the fiber as well. In such a case, the injected light strikes the mirror and then propagates through a length of the fiber for distribution or subsequent tapping by another tap.

Figure 1B:
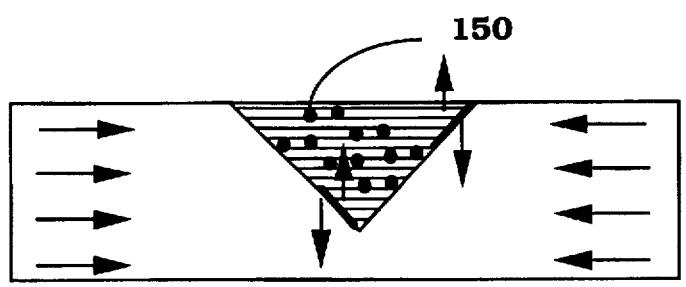
FIG. 1(b) is a cut away view of a POF showing light dispersive elements within a cut and refilled region.

With reference now to FIG. 1(b), there it shows an alternative embodiment of the present invention. Specifically, dispersive elements are added to the refilling material before the material is placed within the cut region of the optical fiber. In this manner, modifications to the mirrors need not be performed, and the nature, concentration and placement of the dispersive elements within the refilling material may be selectively varied thereby permitting a wide range of dispersive characteristics for the finished side-emitting fiber.

At this point those skilled in the art will quickly recognize that a wide variety of dispersive elements may be used. In particular, the dispersive elements may be of a type which cause either refraction or reflection of light. For example, the elements may be small granules of transparent material that have an index of refraction that differs from the core of the optical fiber. Examples of such materials include different polymers, plastics, glass, quartz or air bubbles. Reflective granules may consist of metals or other materials or a combination. Additionally, the elements may be of any shape, i.e., spherical, flakes or many faceted.

Further, the light dispersive elements may be formed on a surface of the mirrors. For example, chemical treatment with an appropriate chemical or solvent, will effectively "frost" the surface of the mirror thereby creating the dispersive elements. Additionally, mechanical treatment such as abrating or "blasting" the surface of the mirror will also create the dispersive elements.

Figure 1C:
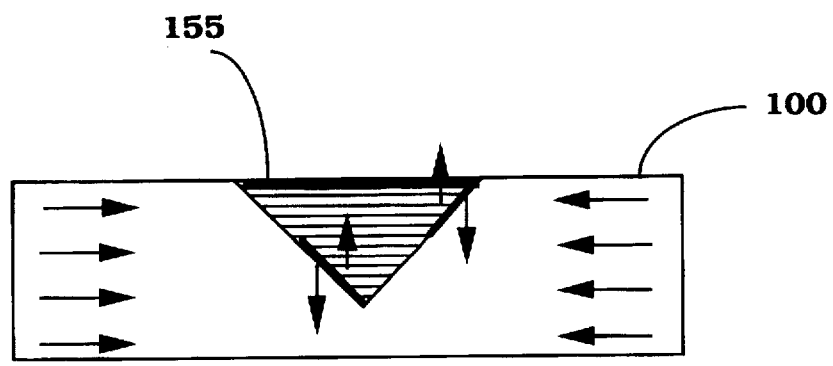
FIG. 1(c) is a cut-away view of a POF showing a light shutter within the cut and refilled region for controllably emitting light.
Figure 1D:
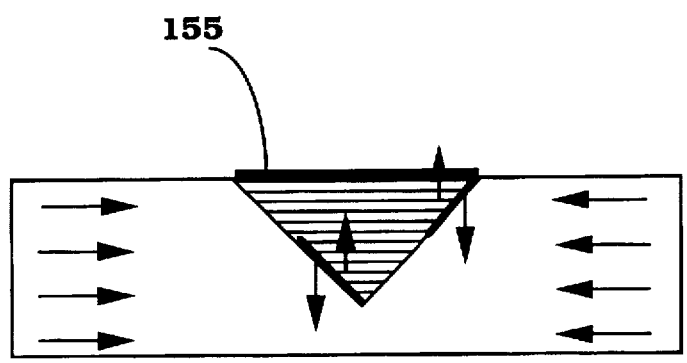
FIG. 1(d) is a cut-away view of a POF showing a light shutter covering the cut and refilled region for controllably emitting light.

An additional embodiment of the present invention is shown in FIG. 1(c). There, optical fiber assembly 100, has a light shutter 155 placed within the refilled region of the cut and refilled optical fiber. The light shutter selectively permits the transmission of light. Consequently, light reflected from internal mirrors must pass through the shutter before exiting the fiber. If the shutter is in a transparent mode, the light passes and exits the fiber. Conversely, if the shutter is in an opaque mode, the light cannot pass. Variations of the shutter are possible such that a degree of transmittance between the transparent and opaque modes are controllable. Alternatively, and as shown in FIG. 1(d), the light shutter may be placed in such a manner as to cover the cut region by bonding to a side of the fiber. Such an arrangement simplifies manufacture.

Figure 1E:
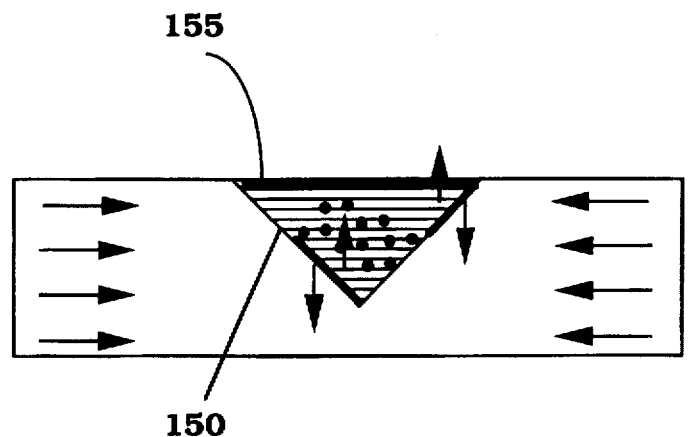
FIG. 1(e) is a cut-away view of a POF showing a light shutter within and covering the cut and refilled region containing light dispersive elements, for controllably emitting diffuse light.
Figure 1F:
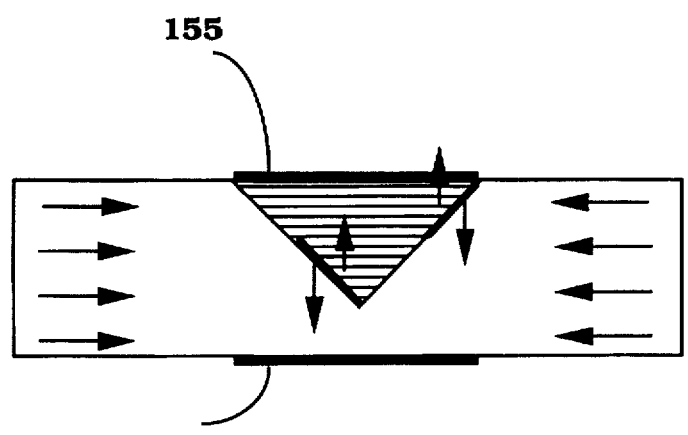
FIG. 1(f) is a cut-away view of a POF showing a light shutter within the cut and refilled region for controllably emitting light and a light shutter on a side of the fiber opposite the cut and refilled region.

Finally, and with reference now to FIG. 1(e), the light shutter is added to the optical fiber assembly shown in FIG. 1(b). Specifically, dispersive elements 150 are placed in the cut and refilled region and covered with light shutter 155. As shown in this Figure, light striking the mirrors is made diffuse upon striking the dispersive elements, and the now diffuse light is selectively emitted depending upon the state of the light shutter. A further embodiment of the light shutter is shown in FIG. 1(f) where a second light shutter is fixed to a side of the optical fiber opposite the cut and refilled region covered with the other light shutter. Such an arrangement permits the selective emission of light from the optical fiber through two opposite sides of the fiber thereby permitting, for example, a single optical fiber to be used in two-sided displays.

The light shutter may be preferably constructed from a liquid crystal structure. More specifically, the light shutter may be an array of liquid crystal elements and may selectively emit light of particular wavelength. The liquid crystal elements may be interconnected in an array of rows and columns, which are addressed by pulsed signals. It should be further understood by those skilled in the art that the light shutter may be any structure which selectively permits the passage of emitted light such as a filter, polarizer, wave plate, etc. Indeed, the light shutter may even enhance the optical characteristics of the emitted light by acting as a lens.

Those skilled in the art will now readily recognize that a great variety of structures or devices may be utilized as light shutters to control the properties of the emitted light, e.g., brightness, color, polarization, etc. Such devices include, but are not limited to, thermal, mechanical, chemical, electro-chemical and electrical modification of materials, either temporary or permanent, that alter the optical properties of the optical fiber, the refilled portion or both.

Materials used as dispersive elements or shutters may be broadly classified as reflective or transmissive elements. Examples of the latter include index-matching or index contrasting material used to fill the cut and refilled region. As those skilled in the art can appreciate, the light which encounters either the light dispersive elements or the light shutters may have its amplitude, phase, or polarization changed due to the interaction with the particular element.

Particular materials which diffract only one specific wavelength, so that they act more like a filter than a diffraction grating are particularly attractive. Such materials include Tellurium Dioxide ($TeO_2$).

Phase-modulation of the light may be converted to amplitude-modulation by a number of means familiar to those skilled in the art so that, e.g., a physical effect providing sensitive modulation of the phase of transmitted light, but little effect on the amplitude of the transmitted light. In a similar manner, changes in the polarization of light can be translated into brightness changes through the use of fixed polarizing elements.

The physical effect affecting material optical properties, and which may be used to control or modulate the emission of light from the dispersive optical fiber includes, but is not limited to electrical or magnetic modulation of the refractive index, polarization, and absorption. Optical modulation may also be used to control these parameters including, optical modulation of the refractive index or absorption through the photochromic effect.

The optical properties may also be controlled by mechanical effect such as "elasto-optical" effects, due to variation of the mechanical strain in the element, or due to scattering of density modulation in the material as well as thermal effects. The reflection-coefficient of reflective elements may be modified by any of these means and in addition, in some materials it is possible to switch the material from a reflective state to a non-reflective state. All such effects may occur in both crystalline as well as glassy or polymeric materials.

Further, the optical characteristics of the elements may be modulated by chemical or electrochemical means, which may or may not produce a permanent or irreversible chemical change in the material comprising the element, as for instance, a pH change to change the color of an indicator dye.

As should now be readily apparent, a useful application of the present invention is to deliver selectively diffuse light to N different locations along the POF, i.e., the delivery of computer, clock, or data signals, or alternatively, in the construction of other light emitting devices.

In this example, a length of POF would be prepared having N side-emitting ports along its length. To achieve a uniform light distribution at each of the N output ports evenly spaced at $\Delta \iota$, and assuming that a total intensity of input light power is unity, the $i^{th}$ output port has a coupling efficiency of $\eta_i$ where $1 \leq i \leq N$, and the POF has an overall length dependent transmission expressed as $\exp(-\beta \iota)$ where $\beta$ and $\iota$ denote a transmission coefficient and fiber length respectively, the following relationship is used:

$$\eta_i = \frac{\eta_1 \exp[(1-i)\beta \Delta l]}{(1-\eta_1)(1-\eta_2)\ldots(1-\eta_{i-1})} \quad (1)$$

If all N ports are distributed along a relatively short length of POF, the absorption dominant exponential term in Equation 1 may be omitted. In such a case, it is relatively easy to find that $\eta_1 = 1/N$, $\eta_2 = 1/(N-1)$, ... $\eta_{N-1} = .05$, $\eta_N = 1$. Once an individual coupling coefficient is determined, a corresponding size of the internal mirror may be calculated.

With reference now to FIG. 1(b), there is shown a cross-section of POF having core 160 and cut-out area 170 in which a mirror is formed (shown shaded). An area of the mirror is related to a projected depth of the cut h, which can easily be monitored during a cutting operation. Using the parameters shown in FIG. 1(b), a circular sector angle $\theta$ may be calculated as:

$$\theta = 2 \cos^{-1}(1-\alpha), \quad (2)$$

where $\alpha = h/r$ is the relative depth of a cut. Within a first order approximation, the intensity inside a large core POF is uniformly distributed. Thus, the mirror coupling coefficient $\eta$ may be defined as the ratio $\eta = S/(\pi r^2)$, where S is the area of the mirror (shown shaded in FIG. 1(b)) and r is the radius of the POF. Since the mirror area S is:

$$S = \frac{\theta r^2}{2} - a\sqrt{r^2 - a^2}, \quad (3)$$

with $$a = r\sin(\theta/2), \quad (4)$$

those skilled in the art can readily understand that the following relations exist between $\eta$ and $\alpha$:

$$\eta = \frac{\cos^{-1}(1-\alpha)}{\pi} - \frac{1}{\pi}\sqrt{\alpha(2-\alpha)(1-\alpha)^2} \quad (5a)$$

for $0 \leq \alpha < 1$ and $$\eta = 1 - \frac{\cos^{-1}(\alpha-1)}{\pi} + \frac{1}{\pi}\sqrt{\alpha(2-\alpha)(1-\alpha)^2} \quad (5b)$$

for $1 \leq \alpha \leq 2$.

Equations (1) and (5) may be used to determine the depth of cuts used to form N mirrors along a length of POF.

Figure 2:
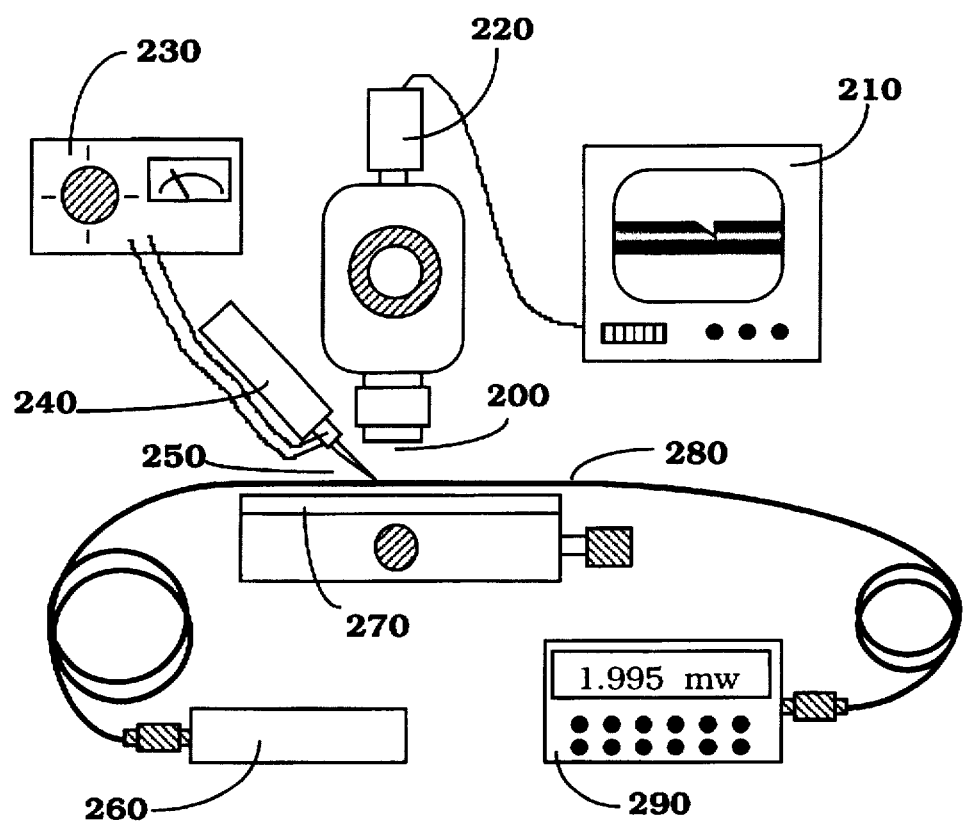
FIG. 2 shows an apparatus for manufacturing a sequence of micro-mirrors along a length of POF.

Referring now to FIG. 2, there is shown a system suitable for the construction of POF having internal mirrors in accordance with the teachings of the present invention. Specifically, POF 280 is fixed to micro-meter controlled X-Y translational stage 270. Knife 250, mounted on a micro-meter controlled rotational, translational stage 240 and heated under control of thermo-electric heat controller, is used to cut precise regions from the POF thereby forming internal mirrors. The knife used may be a polished razor blade. The use of the thermo-electric heat controller permits the accurate selection of a cutting temperature for the knife.

Importantly, the electric knife temperature may be selected such that is causes the formation of bubbles, or diffusing elements during the cutting operation. In this inventive manner, both the internal mirror and diffusing element may be constructed simultaneously, before refilling.

Satisfactory results have been obtained using Polymethylmethacryliate (PMMA) fibers (Model TB-750) such as those produced by Asahi Chemical, Ltd. The diameter of the fiber core is 750 µm and has a refractive index of n=1.4994 at wavelength $\lambda$=650 nm. Although the PMMA material is sufficiently soft to be cut at room temperature, experimental results show that using a combination of pressure and a knife temperature in the range of 100° to 100° F. results in a superior finish of the mirror, i.e., surface roughness less than 15 µm.

Preferably during the cutting process, one end of the POF is connected to a light source, i.e., laser 260 with another end of the POF connected to a digital optical power meter 290. In this manner, the intensity output of each mirror may be accurately controlled through on-line monitoring of residue power output at the power meter end of the POF. With reference now to FIG. 3, there it shows a intensity profile of a series of 16 mirrors uniformly constructed along a 20 mm section of PMMA fiber. Inasmuch as there was no metallic coating deposited on the surface of any of the mirrors, reflections were due to the total internal reflection at PMMA/air interface. Despite this fact, a good contrast ratio of better than 15:1 has been observed.

Those skilled in the art will readily appreciate that the residue light power may be monitored at the individual mirrors, rather than at the output end of the fiber. Using this on-line monitoring method. PMMA fibers have been constructed having 200 side-emitting output ports exhibiting port-by-port intensity fluctuations under 20%.

Straightforward modifications to the above-described mirror formation method can also be employed to allow parallel cuttings. In particular, multiple knifes having predetermined cutting angles and depths may be used simultaneously to speed up the entire fabrication procedure although precise control of light fluctuations is more difficult. Furthermore, by fixing either the fiber position while changing the directions of cutting, or fixing the direction of cutting while changing the fiber feeding direction, light can be coupled out of the fiber in almost any direction in 3D space thereby providing a large degree of flexibility in the application of a finished fiber.

In particular, the mirrors may be either flat or curved. In this manner, light may be diverted out of the fiber through the entire circumference of the fiber, or portions thereof. Furthermore, the light diverted out of the fiber may be diverted out at angles less than perpendicular to the sides of the fiber. Additionally, the mirrors may be made partially reflecting or partially transmitting, depending upon the specific application.

As an additional example of the present invention, a 2 mm thick transparent polycarbonate plate was machined to create an array of 10 parallel V-groves with a 2 mm spacing between any two consecutive grooves. A long PMMA fiber was then cemented into the grooves. A series of 100 mirrors, cut using the above-described cutting method was then performed. Those mirrors which are subsequently measured to be too small can obviously be enlarged by additional cutting. Conversely, those which are subsequently measured to be too large, may be partially or completely filled with suitable material, i.e. epoxy, PMMA, etc. FIG. 5 shows a 10×10 light spot pattern generated by such a processed plate.

Clearly, it should now be quite evident to those skilled in the art, that while the invention was shown and described in detail in the context of a preferred embodiment, and with various modifications thereto, a wide variety of other modifications can be made without departing from scope of the inventive teachings. For example, well-known laser or other cutting devices may substitute for the mechanical knives uses and described. Similarly, the internal mirrors need not be flat, but rather could be any suitable shape. Therefore the invention should only be limited by the following claims.

We claim:

1. A light dispersive optical fiber for distributing and dispersing light traversing an optical fiber comprising:
    one or more mirrors, positioned within the optical fiber such that a desirable portion of the light traversing the optical fiber strikes the mirror and is deflected out a side of the optical fiber wherein said mirrors are constructed by cutting the optical fiber and removing a portion of the optical fiber such and a mirror region is created and said mirror region is subsequently refilled with a suitable material; and
    dispersive elements positioned within the cut portion such that the deflected light strikes the dispersive elements and is dispersed before exiting the side of the optical fiber.

2. The light dispersive optical fiber according to claim 1 further comprising:
    a light shutter, covering the cut portion such that the light exiting the side of the fiber must pass through the light shutter.

3. The light dispersive optical fiber according to claim 2 wherein said light shutter is situated within the cut portion of the optical fiber.

4. The light dispersive optical fiber according to claim 2 wherein said light shutter is affixed to the side of the fiber through which the light exits and completely covers the cut portion of the optical fiber.

5. The light dispersive optical fiber according to claim 2 wherein said optical fiber is coupled to a light source and a power meter such that light power may be monitored during the cutting of the optical fiber.

6. The light dispersive optical fiber according to claim 2 further comprising:
    a second light shutter, affixed to a side of the optical fiber opposite the light shutter covering the cut portion such that light exiting the side of the fiber opposite the cut portion must pass through the second shutter to exit.

7. The light dispersive optical fiber according to claim 2 wherein said light shutter is a liquid crystal device.

8. The light dispersive optical fiber according to claim 2 wherein said light shutter is an optical filter.

9. The light dispersive optical fiber according to claim 2 wherein said light shutter is a polarizing filter.

10. The light dispersive optical fiber according to claim 2 wherein said light shutter comprises a crystal of Tellurium Dioxide.

11. The light dispersive optical fiber according to claim 1 wherein said dispersive elements are applied to a surface of the mirror.

12. The light dispersive optical fiber according to claim 11 wherein said dispersive elements are index-matching materials.

13. The light dispersive optical fiber according to claim 11 wherein said dispersive elements are index-contrast materials.

14. The light dispersive optical fiber according to claim 11 wherein said dispersive elements are formed by chemically treating a surface of the mirror.

15. The light dispersive optical fiber according to claim 11 wherein said dispersive elements are formed by mechanically treating a surface of the mirror.

16. The light dispersive optical fiber according to claim 11 wherein said dispersive elements are optically reflective.

17. The light dispersive optical fiber according to claim 11 wherein said dispersive elements are optically transmissive.

18. The light dispersive optical fiber according to claim 1 wherein the optical fiber is a suitable polymeric material.

19. The light dispersive optical fiber according to claim 18 wherein said dispersive elements are bubbles formed in the optical fiber during the cutting of the cut portion.

20. The light dispersive optical fiber according to claim 1 wherein said dispersive elements are added to the refilling material before the cut portion is refilled.

21. The light dispersive optical fiber according to claim 1 wherein said dispersive elements further comprise Titanium Dioxide.

22. A light dispersive optical fiber for distributing and dispersing light traversing an optical fiber comprising:
    one or more mirrors, positioned within the optical fiber such that a desirable portion of the light traversing the optical fiber strikes the mirror and is deflected out a side of the optical fiber wherein said mirrors are constructed by cutting the optical fiber and removing a portion of the optical fiber such and a mirror region is created and said mirror region is subsequently refilled with a suitable material;

dispersive elements positioned within the cut portion such that the deflected light strikes the dispersive elements and is dispersed before exiting the side of the optical fiber; and an array of selectively addressable light shutters, affixed to the light exiting side of the optical fiber, such that the exiting light must pass through the light shutter array.

23. The light dispersive optical fiber according to claim 22 further comprising:

a second array of selectively addressable light shutters, affixed to a side of the optical fiber opposite the light exiting side of the optical fiber, such that light exiting this opposite side must pass through the second light shutter array.

* * * * *